United States Patent [19]

Curran et al.

[11] Patent Number: 5,503,579
[45] Date of Patent: Apr. 2, 1996

[54] REMOVABLE FLY ROD FLOTATION DEVICE

[76] Inventors: Daniel J. Curran; Stephanie A. Stern, both of 719 Dennison Ave., Ft. Collins, Colo. 80526

[21] Appl. No.: 368,100

[22] Filed: Jan. 3, 1995

[51] Int. Cl.$^6$ .................................................. B63B 22/16
[52] U.S. Cl. ................................................ 441/6; 43/18.1
[58] Field of Search ...................... 441/1, 6, 8; 43/18.1, 43/21.2, 25

[56] References Cited

U.S. PATENT DOCUMENTS

| | | | |
|---|---|---|---|
| 2,892,198 | 6/1959 | Gruenberg | 43/25 |
| 4,583,314 | 4/1986 | Kirkland | 43/25 |

*Primary Examiner*—Jesus D. Sotelo

[57] ABSTRACT

A removable flotation device for use on a fly fishing rod and reel assembly to prevent the fly rod and reel from submerging when accidentally dropped or otherwise placed in water. The flotation device is comprised of a generally flexible material that provides a reliable buoyancy force and allows the flotation device, when attached, to mold about a handle and corresponding reel seat of the fly rod. When attached, the flotation device does not degrade the proper use and quality of the fly rod and reel during the act of fly fishing.

18 Claims, 4 Drawing Sheets

REMOVABLE FLY ROD FLOTATION DEVICE

1. BACKGROUND—CROSS REFERENCES

This application is being filed in subsequent conjunction to previously filed Patent Disclosure Document #351974 dated Apr. 11, 1994.

2. BACKGROUND—FIELD OF INVENTION

This invention relates generally to a removable flotation device, and more specifically to a removable flotation device for use on a fly fishing rod and reel assembly.

3. BACKGROUND—DISCUSSION OF PRIOR ART

With the recent introduction of float tubes or "belly boats" into the fly fishing marketplace, the interest in fly fishing has increased dramatically over the last several years. More and more fly fishermen are taking to the water of lakes and larger streams, using their float tubes to search for the ideal fishing experience. As fly fishermen are no longer relegated to fishing from the lake shore or to merely wading a river, more fly fishermen are now faced with the unfortunate prospect of accidentally dropping their rods into the water while unhooking a fish, tying on a fly, or maneuvering their float tubes. Despite their featherweight design, no fly rod and reel combination available on the market today floats when submerged in water.

In the past, numerous inventors have devised clever solutions to the problem of locating and retrieving submerged fishing gear. While many of these mechanisms are creative in their own light, none of them actually prevent the rod and reel from sinking in the first place. Typical of such mechanisms is the invention illustrated in U.S. Pat. No. 5,156,562 (Pearson and Smith, Oct. 20, 1992) that discloses a rod flotation device designed to mount upon a spinning type of fishing rod. This device employs a water soluble pin that softens and deteriorates upon immersion in water to release a marking buoy. The marking buoy, in turn, is tethered to the sunken gear, thereby allowing for retrieval of the lost rod and reel. Besides being rather complex and potentially unreliable, these "water soluble" mechanisms are prone to accidental activation by rain, snow, or incidental contact with water and, in fact, actually require the rod and reel to sink for proper deployment.

Furthermore, the location and retrieval devices of the type described above are strictly limited for use on spinning or bait casting types of fishing rods. Devices such as that cited in U.S. Pat. No. 4,583,314 (Kirkland, Apr. 22, 1986) are not feasible for use on fly fishing rods without significantly compromising the look, feel, or action of the fly rod itself. This specific "flotation device" is designed to mount on a spinning rod above the reel at a point which, on a fly rod, is reserved for the handgrip. The invention cannot be alternatively mounted further up on the fly rod without degrading aesthetics, flexibility, and possibly the free release of line from the fly reel spool. The act of casting a fly rod requires that the rod be completely unencumbered by any additional weight and ideally, the fly rod should feel like a flexible extension of the fisherman's arm. These type of marking buoys do not meet these performance objectives and are obviously not intended for use on fly fishing rods.

Other prior art solutions have focused upon developing floating fishing rod and reel assemblies. Although these devices are specifically designed for buoyancy, they are strictly limited for use as spinning or bait fishing rods. Representative of these inventions, U.S. Pat. No. 5,203,104 (Brauer, Apr. 20, 1993) shows a nonsubmersible fishing rod and reel comprised of several unique flotation features. While achieving the desired flotation goal, this assembly is far too cumbersome and is simply not applicable for use as a fly fishing rod. Many fly fisherman, in fact, actually build their own fly rods and impart a great deal of effort into their work. Efforts to ensure flotation at the expense of fly rod aesthetics and response render such a nonsubmersible fly rod impractical.

Finally, devices are known which merely provide improved handgrips for fishing rods. The inventions do not assure flotation and, again, are limited for use on spinning or bait casting rods. Accordingly, U.S. Pat. No. 3,973,347 (Shell) cites a handgrip which wraps around a spinning rod handle to provide extra cushioning and added comfort. However, this device does not provide any added buoyancy force and a fishing rod would sink just as readily with or without such an invention attached.

In summary, the prior an fails to disclose an adequate and effective flotation device for specific use on fly fishing rods. Previous inventors have focused their development efforts solely on solutions for spinning or bait fishing rods and the unique design challenges posed by fly fishing rod and reel assemblies have received little if no attention in the past. Despite a longfelt need, no device presently exists that can be detachably secured to a fly fishing rod which will simply and reliably prevent the rod and reel from sinking when immersed in water.

4. OBJECTS AND ADVANTAGES

Accordingly, several objects and advantages of the present invention are:

a) to provide a fly rod flotation device which will simply and reliably ensure flotation when the rod and reel are immersed in water, b) to provide a fly rod flotation device which, when attached, does not compromise the look, feel, or action of the fly rod itself, c) to provide a fly rod flotation device which can readily and easily be attached to and detached from a fly rod, and d) to provide a fly rod flotation device which can be detachably secured to fly rods employing both down and up-locking reel seats.

Further objects, features, and advantages of the present invention will become apparent from a consideration of the drawings and ensuing description.

5. DRAWING FIGURES

6. Reference Numerals in Drawings

| | |
|---|---|
| 10 fly rod handle | 12 fly reel |
| 14 reel stem | 16 stem base |
| 18 handgrip | 20 reel seat |
| 22 rod butt | 24 handgrip fastener |
| 26 butt fastener | 32 adjustable attachment ring |
| 34 fixed attachment ring | 35 enlarged portion |
| 36 adjustment rings | 38 threaded portion |
| 40 removable flotation device | 42 cup portion |
| 44 upper portion | 46 cloth pocket |
| 48 loop | 50 contoured edges |
| 52 foam edges | 54 cup opening |
| 56 foam base | 58 added foam |
| 60 raised section | 62 stitching |
| 64 bottom seam | 66 cloth layers |

7. DESCRIPTION—FIGS. 1 TO 5

Figure 1:
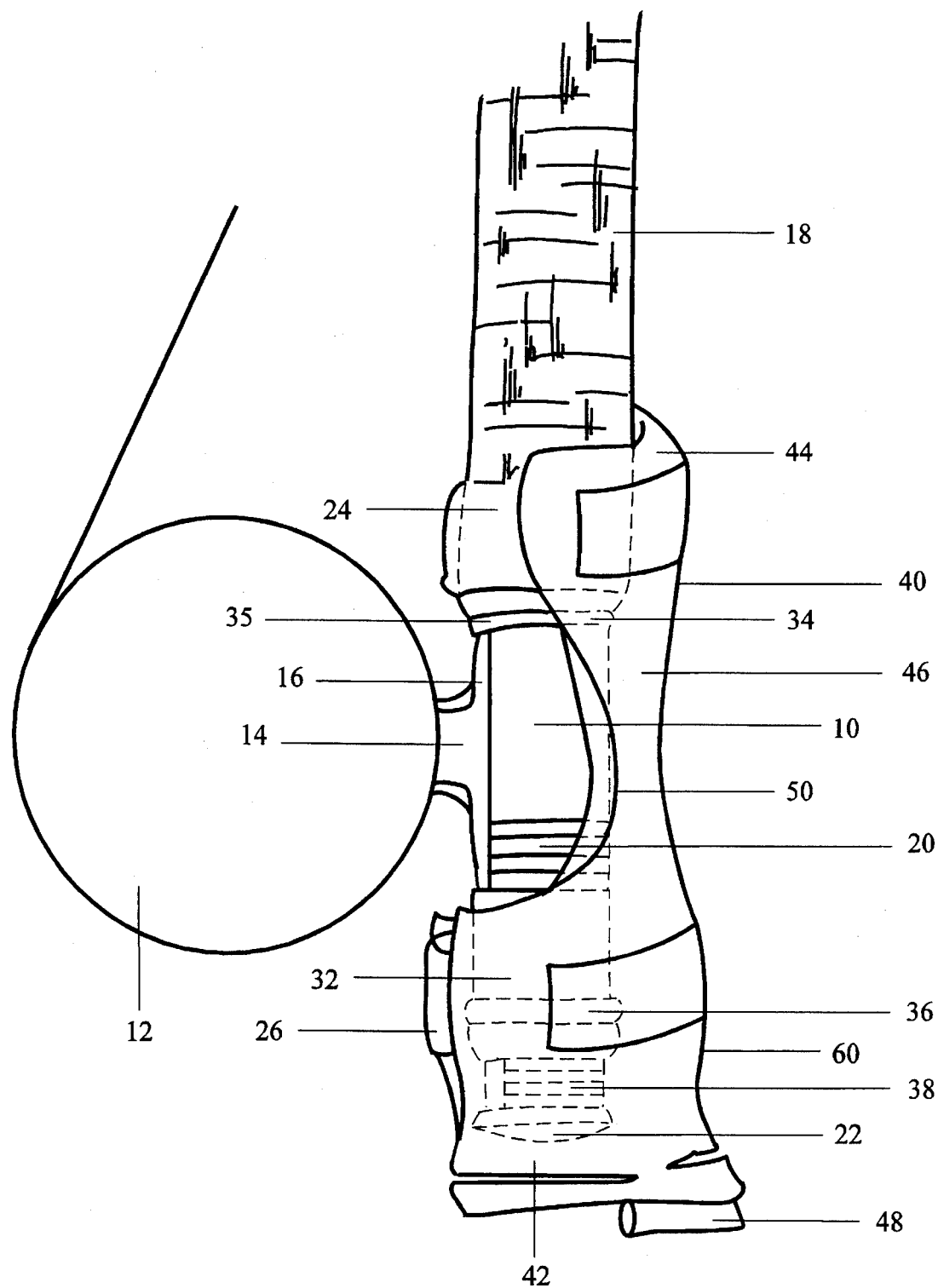
FIG. 1 is a perspective view showing a fly fishing rod and reel that mounts a removable flotation device of the present invention on an up-locking reel seat.
Figure 2:
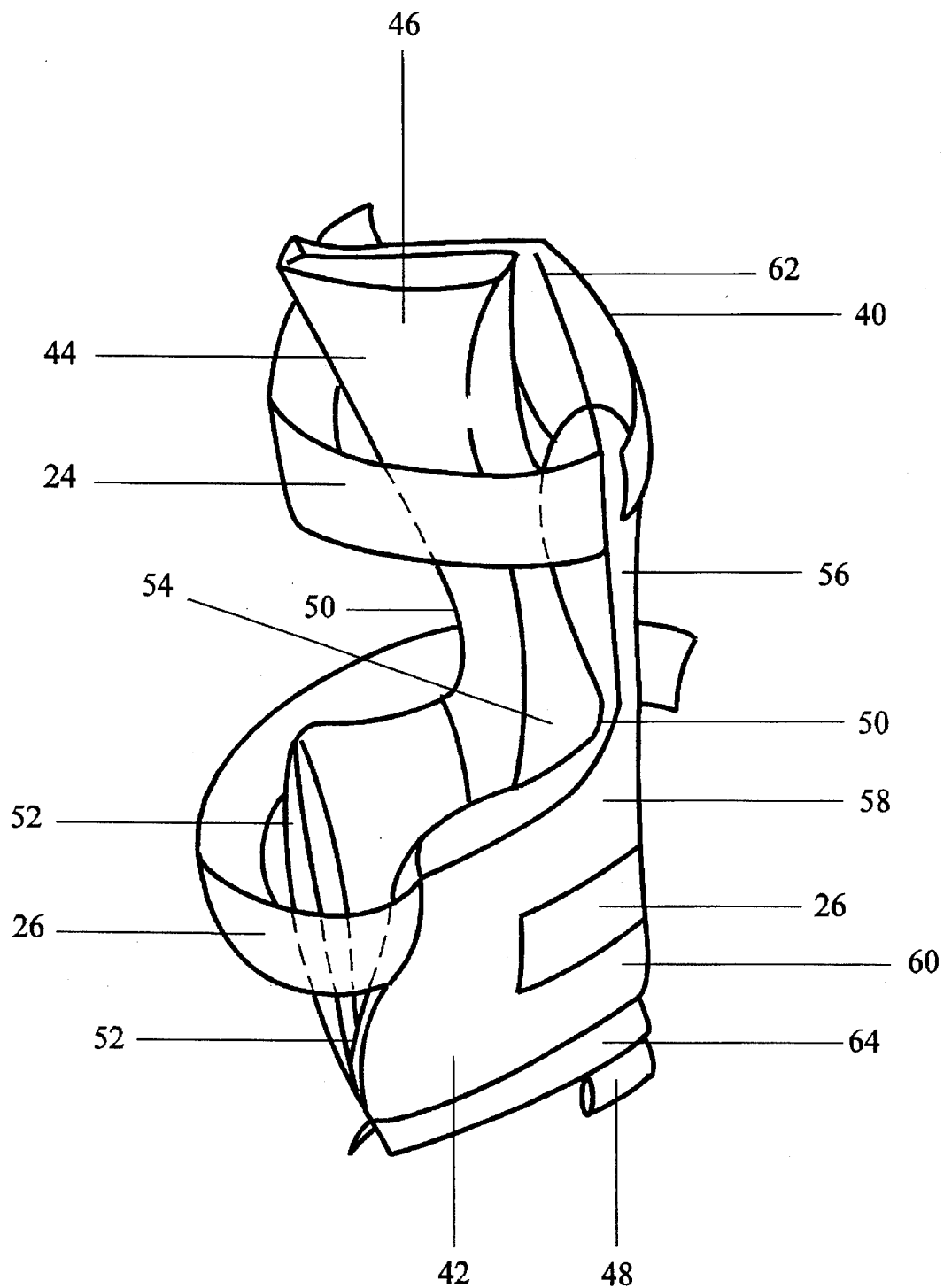
FIG. 2 is a frontal view of the flotation device detached from the fly rod.
Figure 3:
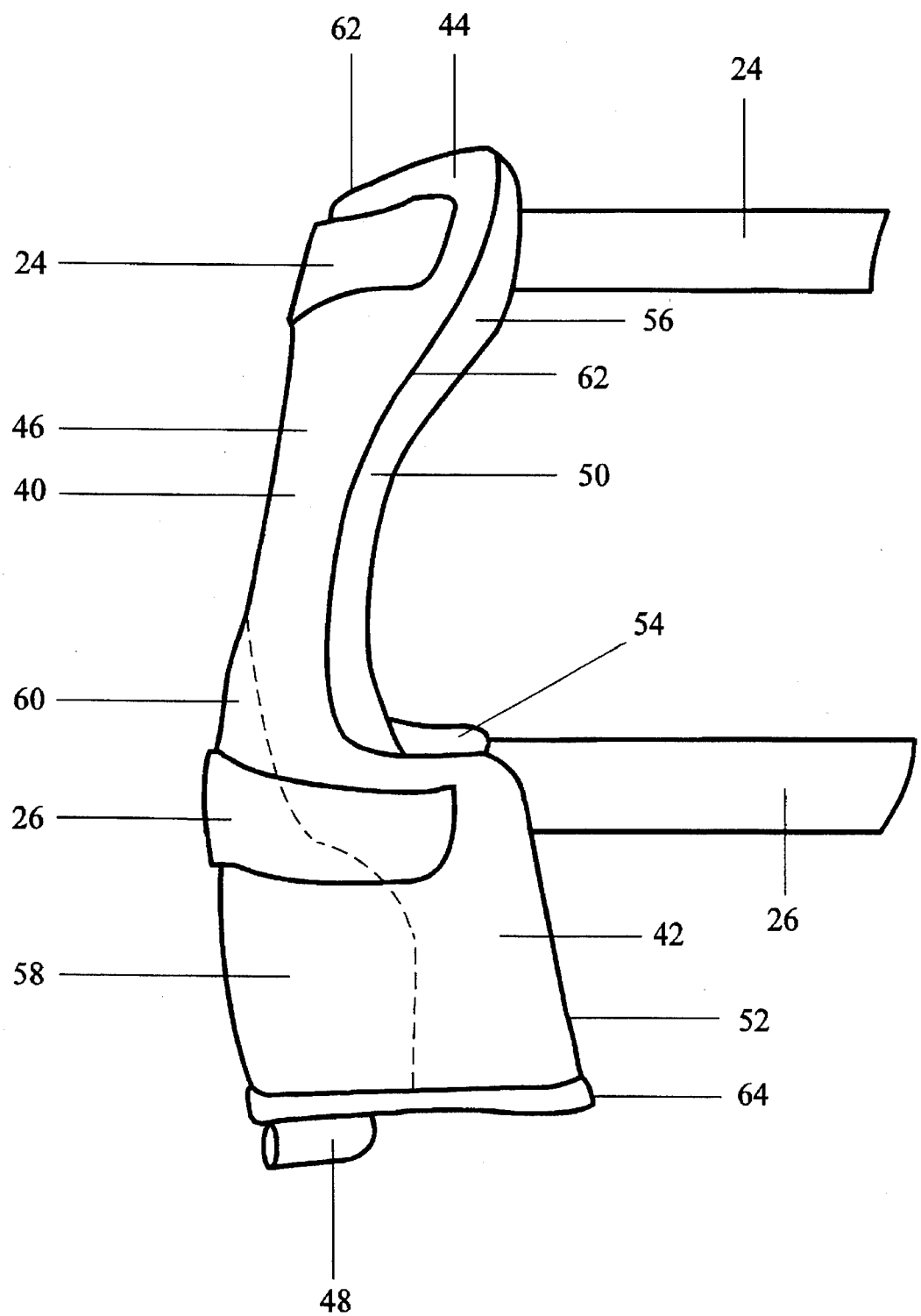
FIG. 3 is a rear view of the flotation device detached from the fly rod as in FIG. 2.
Figure 4:
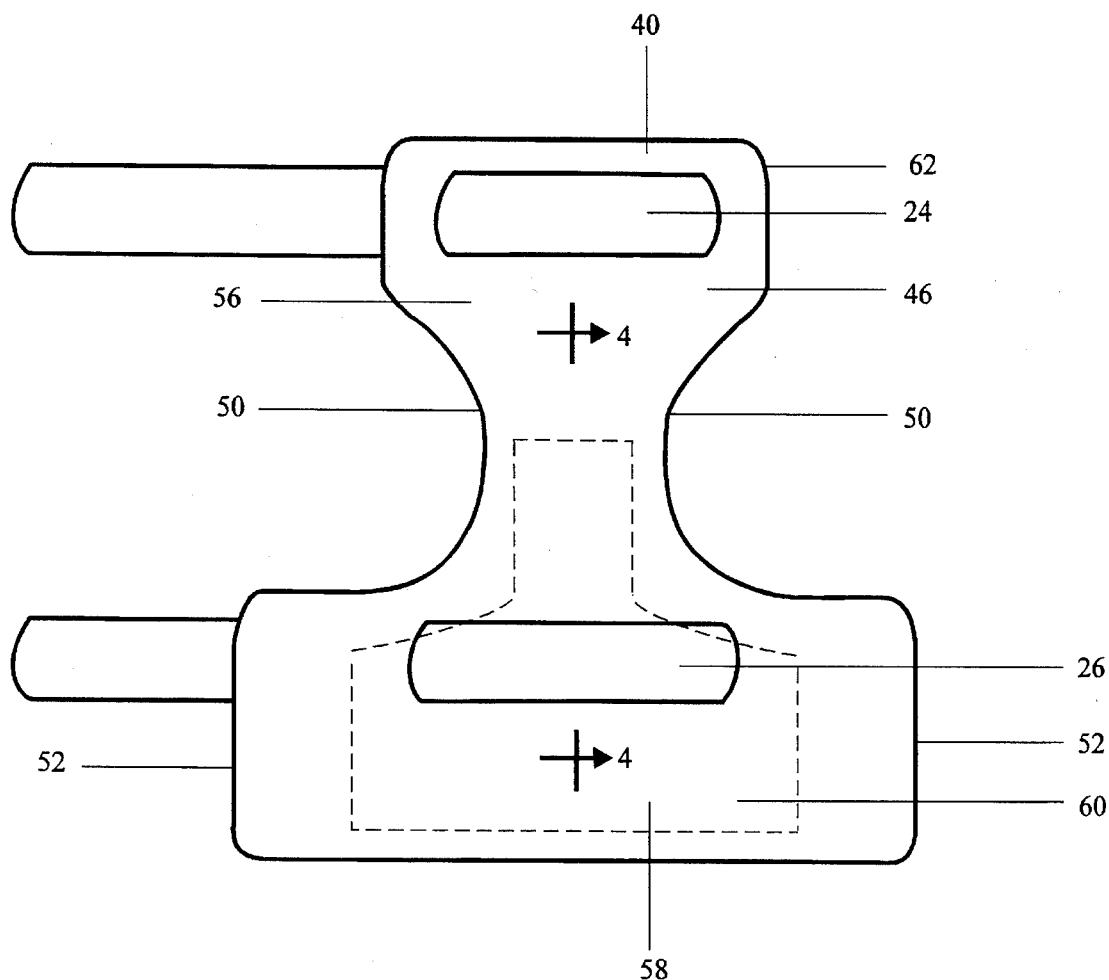
FIG. 4 is a flat view of the flotation device before the bottom cup seam is sewn together, detailing the sheet-like foam construction.

With reference to FIG. 1 of the drawings, a fly fishing rod handle 10 mounts a fly reel 12 by way of a reel stem 14. Handle 10 is shown partially covered by a removable flotation device 40 of the present invention and includes a reel seat 20 whose components secure a base 16 of the reel stem to the handle. Reel seat 20 includes a fixed attachment ring 34 encircling the handle and having an enlarged portion 35 that receives one end of stem base 16. The other end of stem base 16 is received within an adjustable attachment ring 32 and thus permits the stem base to be released from handle 10. A pair of adjustment rings 36 of the reel seat are located on a threaded portion 38 of the handle so that each adjustment ring can be individually moved axially in either direction by being rotated about the handle. To mount fly reel 12, adjustment rings 36 are moved toward adjustable attachment ring 32 to engage it and securely clamp stem base 16 between the two attachment rings.

The preceding description illustrates what is commonly referred to as an "up-locking" reel seat or one in which fixed attachment ring 34 is located immediately below handgrip 18. Upon further discussion, it becomes apparent that removable flotation device 40 can also be readily attached to a fly rod employing a "down-locking" reel seat in which fixed attachment ring 34 is located instead, towards rod butt 22. In this case, fixed attachment ring 34 and adjustable attachment ring 32 swap positions on fly rod handle 10 so that the components of reel seat 20 are effectively inverted. Threaded portion 38 of the handle and the accompanying pair of adjustment rings 36 would then be located above, rather than below, adjustable attachment ring 32 allowing for securement of stem base 16 in a manner similar to that previously detailed for the up-locking example. In either case, the mounting or demounting of fly reel 12 is, of course, accomplished with flotation device 40 removed from fly rod handle 10.

Figure 5:
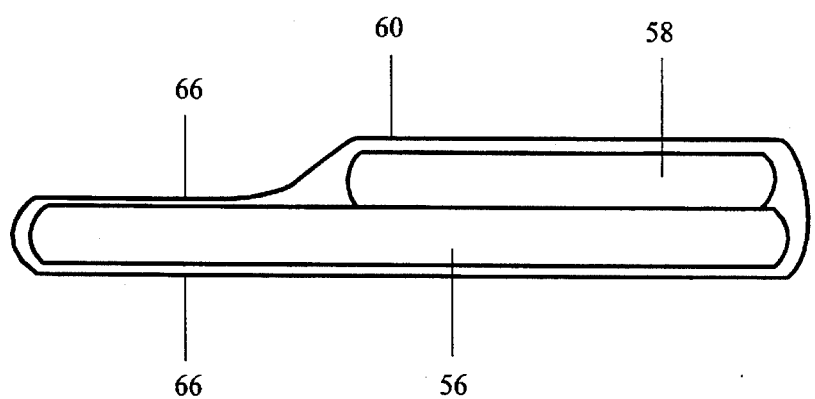
FIG. 5 is a sectional view of the flotation device taken along line 4—4 of FIG. 4.

With additional reference to FIGS. 2 through 5, removable flotation device 40 of the present invention is constructed of a flexible cloth covering which encapsulates two layers of pliable closed cell foam. FIG. 5 shows that the general sheet-like construction includes two layers of cloth 66 and two layers of foam made up of a foam base 56 and a secondary portion of added foam 58. The two layers of cloth 66 are formed into a pocket 46 by a suitable means such as stitching 62 around the marginal edges of the flotation device. Foam pieces 56 and 58 can then be inserted into cloth pocket 46 to form the phase of assembly illustrated in FIG. 4. Here, the device is essentially a flat, foam filled pocket whose planar shape is primarily determined by the underlying form of foam base 56. Also evident is a raised section 60 produced by the bulk of added foam 58 which rests atop foam base 56 and a pair of foam edges 52 which are entirely isolated from one another. In the final assembly viewed in FIGS. 2 and 3, a cup portion 42 is created by pinching foam edges 52 together and stitching along a bottom seam 64. In this manner, foam edges 52 are held together at their bottom corners to produce a V-shaped cup opening 54. Foam base 56 is also shown with a pair of contoured edges 50 that connect an upper portion 44 to cup portion 42 of flotation device 40.

In the preferred embodiment, two separate hook and loop fasteners are provided to secure flotation device 40 to fly rod handle 10. A handgrip fastener 24 is located on upper portion 44 for attachment to handgrip 18. Additional attachment to fly rod handle 10 is provided by a butt fastener 26 which is positioned on cup portion 42 as viewed in FIG. 2. The two fasteners are secured to cloth pocket 46 by any suitable means such as stitching. An additional loop 48 is also sewn to bottom seam 64 to which a possible tether line or cord can be connected, if so desired, for further fly rod securement.

Removable flotation device 40 is designed to provide a custom and extremely unobtrusive fit to fly rod handle 10. When tightened, handgrip fastener 24 causes upper portion 44 to wrap around and mold to handgrip 18, while not allowing upper portion 44 to slip down below reel stem 14. Upper portion 44 also does not extend past the beginning of handgrip 18 so that flotation device 40 does not compromise the fly fisherman's grasp on handgrip 18 nor hinder the free release of line from fly reel 12. Contoured edges 50 further streamline flotation device 40 and eliminate any incidental contact with fly reel 12. When butt fastener 26 is cinched down, cup portion 42 forms to rod butt 22 and precludes any contact of cup edges 50 with fly reel 12. Furthermore, the relative location of flotation device 40 on fly rod handle 10 can be easily adjusted to fit different rod handle sizes and reel seat configurations while maintaining a streamlined and unobtrusive attachment.

8. OPERATION—FIGS. 1, 2, AND 3

As detailed above, two hook and loop fasteners provide for detachable securement of removable flotation device 40 to fly rod handle 10. Flotation device 40 is typically mounted to fly rod handle 10 according to the following procedure. First, cup portion 42 is placed around rod butt 22 with butt fastener 26 loosely connected. Next, upper portion 44 is positioned at the extreme end of handgrip 18 so that cup portion 42 houses rod butt 22 and does not conflict with the edges of fly reel 12. Handgrip fastener 24 is then cinched down to secure upper portion 44 to the end of handgrip 18. Once handgrip fastener 24 is secure, butt fastener 26 is tightened down and flotation device 40 is centered along the back side of rod handle 10 directly opposite fly reel 12. As mentioned earlier, handgrip and butt fasteners 24 and 26 cause the flotation device 40 to hug rod handle 10 and thereby provide a custom fit. Conversely, flotation device 40 is simply removed from fly rod handle 10 by disconnecting both the handgrip and butt fasteners and removing rod butt 22 from within cup portion 42.

When attached according to the preceding description and as shown in FIG. 1, flotation device 40 is firmly secured to fly rod handle 10 and does not slide out of position. Since handgrip and butt fasteners 24 and 26 are of the hook and loop type, their securement is not negatively affected by prolonged exposure to water or to the elements. As outlined previously, handgrip fastener 24 does not allow upper portion 44 of the flotation device to slip down below reel stem 14, while butt fastener 26 prevents rod butt 22 from dislodging from cup portion 42. Foam base 56 and added foam 58 are waterproof as well and their countless numbers of closed air cells provide an extremely simple and reliable buoyancy force.

Without flotation device 40 attached, a fly rod and reel combination quickly sinks when immersed in water. The weight of the fly rod and reel is concentrated primarily at rod handle 10 where fly reel 12 is attached. Therefore, when the fly rod is placed or dropped into water, the concentrated weight of fly reel 12 causes it to sink rapidly, thereby pulling the fly rod down below the surface of the water. In this manner, a sinking fly rod will tend to align itself vertically in the water as fly reel 12 sinks at a far greater rate than the opposite tip of the fly rod.

When attached, flotation device 40 will simply and reliably prevent the fly rod and reel from sinking in water by providing the necessary buoyancy force directly opposite fly reel 12. Closed cell foam base 56 and added foam 58 are far less dense than water and they effectively combine to counteract the concentrated weight of fly reel 12 and keep the fly rod and reel assembly afloat. Added foam 58 is included to provide extra buoyancy, while keeping flotation device 40 small and as unobtrusive as possible. With flotation device 40 attached, a fly fishing rod and reel that are accidentally dropped into water will float flat on the surface until the fly fisherman can retrieve the lost gear. Additionally, the fly rod and reel can be retrieved by an optional tether cord attached to loop 48.

9. SUMMARY, RAMIFICATIONS, AND SCOPE OF INVENTION

Thus the reader can see that the present invention provides a simple and extremely reliable fly rod flotation device that ensures flotation and does not compromise the look, feel, or use of the fly rod and reel. The flotation device is very unobtrusive and provides a streamlined, custom fit to fly rods employing both up and down-locking reel seats.

While the preceding description contains many specificities, these should not be construed as limiting the scope of the invention, but rather as exemplifying one preferred embodiment of this invention. For example, the flotation device could be the product of an injection molded process in contrast to the aforementioned cloth and foam construction, or the invention could derive its flotation force from some other means such as a balloon-like structure. Additionally, the flotation device could also have a different shape that lacks contoured edges, has a larger or smaller cup section, or might include extra cloth panels for added foam and increased buoyancy.

Accordingly, the scope of the invention should be determined not by the embodiment illustrated, but by the appended claims and their legal equivalents.

We claim:

1. A flotation device for use upon a fly rod and reel assembly to prevent said fly rod and reel assembly from sinking when immersed in water, comprising:

(a) a buoyant structure of sufficient size to solely ensure flotation of said fly rod and reel assembly, (b) a cup portion into which a rod butt of said fly rod and reel assembly can be inserted when said flotation device is mounted about a reel seat of said fly rod and reel assembly, (c) a flexible covering to encapsulate said buoyant structure, and (d) means for detachably securing said buoyant structure about said reel seat of said fly rod and reel assembly whereby said flotation device, when attached, does not compromise the performance of said fly rod and reel assembly during the act of fly fishing.

2. The flotation device of claim 1 wherein said buoyant structure is comprised of a plurality of closed cell foam portions.

3. The flotation device of claim 2 wherein said foam portions include a pair of contoured edges to preclude any incidental contact to an attached fly reel or to a fly fisherman's hand during the act of fly fishing.

4. The flotation device of claim 2 wherein said foam portions provide a raised section which contributes additional buoyancy capabilities to said flotation device.

5. The flotation device of claim 1 wherein said flexible covering is provided by two layers of cloth which are secured to each other to form a pocket.

6. The flotation device of claim 1 wherein said flexible covering includes a loop for connection of a possible tether cord to said flotation device to allow for simple retrieval of said fly rod and reel assembly in moving water.

7. The flotation device of claim 1 wherein said means for detachably securing comprises a plurality of hook and loop fasteners which are attached to said flexible covering.

8. The flotation device of claim 7 wherein said plurality of hook and loop fasteners include both a handgrip and a butt fastener.

9. The flotation device of claim 8 wherein said handgrip and butt fasteners cause said flotation device to mold to a handle of said fly rod and reel assembly.

10. A flotation device for use upon a fly rod and reel combination to prevent said fly rod and reel combination from sinking when accidentally dropped into water, comprising:

(a) a portion of buoyant material having sufficient size to solely support said fly rod and reel combination in water, (b) a cup portion to house a rod butt of said fly rod and reel combination when said flotation device is mounted along a reel seat of said fly rod and reel combination, (c) means for detachably mounting said buoyant structure to said fly rod and reel combination, and (d) a flexible covering to encapsulate said buoyant material whereby, when attached, said flotation device does not degrade the proper use and quality of said fly rod and reel combination during the act of fly fishing.

11. The flotation device of claim 10 wherein said buoyant material is composed of several closed cell foam pieces.

12. The flotation device of claim 11 wherein said foam pieces include a pair of contoured edges to prevent any hindrance during the act of fly fishing.

13. The flotation device of claim 11 wherein said foam pieces provide a raised section which produces additional buoyancy capabilities to said flotation device.

14. The flotation device of claim 10 wherein said flexible covering is constructed of two layers of cloth which are secured to one another by a suitable means such as stitching.

15. The flotation device of claim 10 wherein said flexible covering includes a loop to which a tether cord can be attached to allow for simple retrieval of said fly rod and reel combination in a moving body of water.

16. The flotation device of claim 10 wherein said means for detachably mounting comprises a plurality of hook and loop fasteners that are secured to said flexible covering.

17. The flotation device of claim 16 wherein said plurality of hook and loop fasteners includes both a handgrip and a butt fastener.

18. The flotation device of claim 17 wherein said handgrip and butt fasteners cause said flotation device to mold to a handle of said fly rod and reel combination.

* * * * *